United States Patent [19]

Hirotsuka et al.

[11] Patent Number: 4,702,927
[45] Date of Patent: Oct. 27, 1987

[54] METHOD FOR DRYING WATER RETENTIVE SUBSTANCE

[75] Inventors: Motohiko Hirotsuka; Tetsuro Harada, both of Izumisano; Nobuhiro Ohtsubo, Sennan; Hiroyuki Kawade, Izumi; Yoshiyuki Hayakawa; Hitoshi Taniguchi, both of Sennan, all of Japan

[73] Assignees: Fuji Oil Company, Ltd.; Hosokawa Micron Corporation, both of Osaka, Japan

[21] Appl. No.: 825,266

[22] Filed: Feb. 3, 1986

[51] Int. Cl.$^4$ ............................................. A23B 7/02
[52] U.S. Cl. ................................. 426/467; 34/57 R; 241/19; 241/24; 426/518
[58] Field of Search ............... 426/465, 467, 518; 34/57 R; 241/18, 29, 24

[56] References Cited

U.S. PATENT DOCUMENTS

| | | | |
|---|---|---|---|
| 1,293,830 | 2/1919 | McCaw | 241/18 |
| 3,289,950 | 12/1966 | Helming et al. | 241/18 |
| 4,478,371 | 10/1984 | Williams | 241/24 |

*Primary Examiner*—George Yeung
*Attorney, Agent, or Firm*—Wenderoth, Lind & Ponack

[57] ABSTRACT

A method for drying a water retentive substance such as okara which comprises adjusting the shape of a water retentive substance having a water content of 55 to 95% by weight to particles having a particle size of 1.5 to 13 mm and drying by using a novel improved pneumatic conveying drying apparatus comprising a dryer section, a pulverizer section provided at the lower part of the dryer section and a classifier section at the upper part of the dryer section, the substance to be dried being fed to the dryer section at a site at least 500 mm above the pulverizer section. The novel drying apparatus is also provided.

10 Claims, 1 Drawing Figure

200~# METHOD FOR DRYING WATER RETENTIVE SUBSTANCE

FIELD OF THE INVENTION

The present invention relates to a method for drying a water retentive substance and a novel apparatus therefor. More particularly, it relates to a method for drying a water retentive substance, especially, so-called okara (also known as soypulp) without deterioration of its properties and quality, especially, its water retention characteristics, color tone, etc., and a novel pneumatic conveying drying apparatus therefor.

BACKGROUND OF THE INVENTION

There are many inorganic and organic water retentive substances, i.e, substances having high water retention capacity. Okara is one of the representative organic water retentive substances. Okara is the insoluble residue from "tofu", soymilk, soybean protein production and is mainly composed of polysaccharides (e.g., cellulose, hemicellulose, etc.) with a small amount of oligosaccharides and/or fats and oils. Recently, in view of its good water retention characteristics, dried okara has been used as a food additive.

On the other hand, although various drying methods and dryers have been known, they are still insufficient for drying a water retentive substance such as okara without deterioration of its properties and quality.

For example, although it has been known that a substance having a high water content can be dried by using a drum dryer, it is difficult to dry a water retentive substance without deterioration of its properties and quality, especially, without deterioration of its water retention capacity and whiteness by using a drum dryer. Further, there is such a mechanical problem as wear of a blade for scraping a dried product adhered to a drum (see, e.g., Japanese Laid Open Publication No. 148562/1978). It has been also known that a water retentive substance having a high water content can be dried without deterioration of its properties and quality by using a spray dryer. However, in case of a water retentive substance having a low water content, a high viscosity and/or such a large particle size that a nozzle is clogged, it is difficult to dry the substance by using a spray dryer. Further, it is also difficult to dry a substance having a high water content (about 40% or more) by using a known pneumatic conveying dryer, and properties and quality of a water retentive substance are liable to be deteriorated by using such a dryer.

Under these circumstances, the present inventors have intensively studies to find out an efficient drying method of a water retentive substance, especially, okara without deterioration of its properties and quality such as water retention capacity, color tone, etc. As the result, it has been found that a certain kind of a pneumatic conveying drying apparatus is especially suitable for drying a water retentive substance such as okara without deterioration of its properties and quality.

Recently, an improved pneumatic conveying dryer has been developed. This dryer comprises a pneumatic conveying dryer section, a pulverizer section provided at the lower part of the dryer section, a hot gas inlet provided below the pulverizer section, a classifier section provided at the upper part of the dryer section and an exhaust vent connected to the upper end of the classifier. In this dryer, a hot gas flows from the inlet upwardly through the pulverizer and the dryer sections and a substance to be dried is fed to the dryer section through a feeder opening. Firstly, the substance fed falls under the influences of gravity to the pulverizer section. Then, the substance is pulverized and then whirled up toward the classifier section through the dryer section by means of the hot gas flow. The substance is dried during this process. Principally, this dryer is used for drying a hard substance or a substance which requires pulverization (generally, a substance having a low water content). Further, it is very difficult to use this dryer for drying a water retentive substance having a high water content. In fact, when using this dryer for drying okara which is a plastic substance having a high water content, okara adheres to the pulverizer section and the inner surface of the dryer section, which makes the drying difficult. In addition, even if okara is forced to be dried by using this dryer, the properties and quality of the resultant dried okara are deteriorated, for example, lowering of the water retention capacity and browning result.

However, it has been surprisingly found that such a dryer can be efficiently used for drying a water retentive substance having a high water content such as okara by making some improvements based on the following present inventors' finding:

(1) In this dryer, because a substance to be dried is fed to the dryer section at the neighborhood of the pulverizer section, adhesion of the substance such as okara to the inner surface of the dryer section is unavoidable and the properties and quality of the substance (water retention capacity, color tone, etc.) are deteriorated;

(2) When the substance to be dried is fed to the dryer section at a site at least 500 mm above the pulverizer section, adhesion can be prevented;

(3) When the shape of the substance to be dried is adjusted to particles having particle size of 1.5 to 13 mm which is finer than that conventionally employed, a dried product having excellent properties and quality can be efficiently obtained;

(4) When the water content of a substance to be dried is adjusted to 55 to 95% by weight, in case of okara, preferably, 55 to 85% by weight, more preferably, 65 to 75% by weight, adhesion of the substance to the inner surface of the dryer section is prevented and a dried product having excellent properties and quality can be efficiently obtained; and (5) Adhesion of the substance can be also prevented by covering the inner surface of the apparatus with an anti-adhesion region such as a fluorocarbon resin.

OBJECTS OF THE INVENTION

One object of the present invention is to provide an improved method for drying a water retentive substance, especially, okara.

Another object of the present invention is to provide an improved drying apparatus for a water retentive substance, especially, okara.

These objects as well as other objects and advantages of the present invention will become apparent to those skilled in the art from the following description by referring to the accompanying drawing.

SUMMARY OF THE INVENTION

Figure 1:
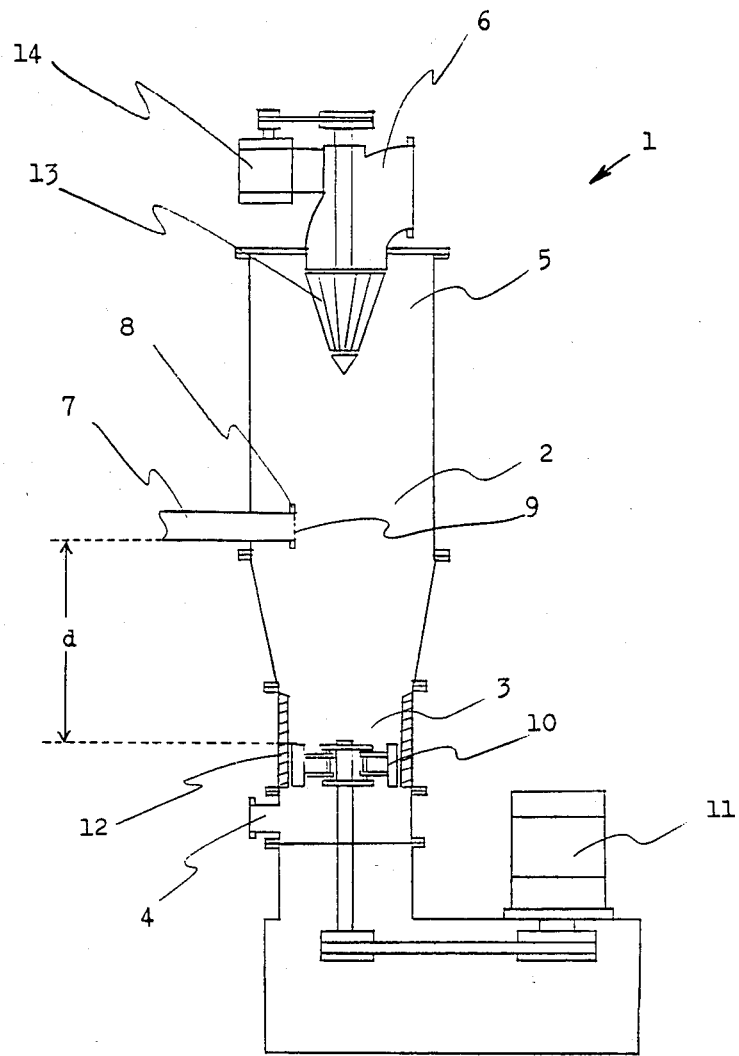
FIG. 1 is a schematic cross section illustrating a preferred embodiment of the drying apparatus of the present invention.

According to the present invention, there is provided a method for drying a water retentive substance which comprises adjusting the shape of a water retentive substance having a water content of 95 to 55% by weight to particles having a particle size of 1.5 to 13 mm and drying the substance by using a pneumatic conveying drying apparatus; said apparatus comprising a pneumatic conveying dryer section, a pulverizer section provided at the lower part of the dryer section, a hot gas inlet provided below the pulverizer section, a classifier section provided at the upper part of the dryer section and an exhaust vent connected to the upper end of the classifier section; said water retentive substance being fed to the dryer section at a site at least 500 mm above the pulverizer section; and, optionally, the inner surface of said drying apparatus being covered with an anti-adhesion resin.

In a preferred aspect of the method of the present invention, one water retentive substance, okara, is dried by adjusting its water content to 55 to 85% by weight, preferably, 65 to 75% by weight and its particle size to 1.5 to 13 mm and feeding okara thus adjusted to the pneumatic conveying drying apparatus in such a manner that okara is fed to the dryer section at a site at least 500 mm above the pulverizer section. In this case, the covering of the inner surface of the drying apparatus is not necessarily required.

The present invention also provides a novel improved pneumatic conveying drying apparatus for drying a water retentive substance having a water content of 55 to 95% by weight which comprises a pneumatic conveying dryer section, a pulverizer section provided at the lower part of the dryer section, a hot gas inlet provided below the pulverizer section, a classifier section provided at the upper part of the dryer section and an exhaust vent connected to the upper end of the classifier section, said dryer section having a feeder opening at a site at least 500 mm above the pulverizer section and, optionally, the inner surface of the apparatus being covered with an anti-adhesion resin.

DETAILED DESCRIPTION OF THE INVENTION

The present invention can be applied to various water retentive substances which are difficult to dry and have water retention capacity (ratio of water to dry solids content in the substance) of at least 3 times, preferably, 3.5 times or more, more preferably, 4.5 times or more. Examples of the water retentive substances include various known inorganic and organic substances. From the view point of preventing deterioration of required properties and quality, the present invention is suitable for drying water retentive edible organic substances such as carbohydrates (e.g., starches) and proteins. Particularly, an insoluble extract residue containing a large amount of cellulose obtained from cereal and/or grain is a useful water retentive substance and the present invention is suitable for drying such an insoluble extract residue. Especially, the present invention is suitable for drying okara.

In the present invention, the water content of the water retentive substance to be dried is adjusted to 55 to 95% by weight, preferably, in case of okara, 55 to 85% by weight, more preferably, 65 to 75% by weight. When the water content exceeds 95% by weight, generally, it exceeds the water retention capacity of the substance and is unsuitable for the drying method of the present invention. When the water content is less than 55% by weight, deterioration of properties and quality by heat of the dried product results.

Adjustment of the water content can be performed by a known manner. For example, in case of drying okara in an industrial scale, a small amount of dried okara can be added to the fresh okara to be dried by recycling a part of the dried product from the same drying process to adjust the water content. Alternatively, okara can be subjected to a pre-drying by using, for example, a inclined disk dryer, a drum dryer, etc. to adjust the water content.

In the present invention, the shape of the water retentive substance to be dried is adjusted to particles having particle size of 1.5 to 13 mm. When the particle size is less than 1.5 mm, the water retentive substance hardly reaches to the pulverizer section of the drying apparatus due to the hot gas flow and is suspended in the dryer section, which makes the residence time of the substance in the dryer section longer and thereby results in deterioration of properties and quality of the substance such as browning and lowering of the water retention capacity due to the heat history. When the particle size is larger than 13 mm, the surface of the water retentive substance is well dried, while the inside thereof is hardly dried. Further, in case of a higher water content, the substance is liable to adhere to the inner surface of the drying apparatus and to cause browning.

The shape of the water retentive substance is not limited to a specific one so far as it is suitable for the drying according to the present invention and it can be in the form of, for example, cubic, cylindrical or globular particles having the above desired particle size. In order to adjust the shape and the particle size of the water retentive substances to be dried, for example, the substance is passed through a punching metal having a desired diameter of holes or slits having desired spaces provided at the open end of the feeder opening. Alternatively, the water retentive substance can be previously cut into a desired shape by a cutter. Further, when the water content of the water retentive substance is previously adjusted to not more than 75%, it can be fed through the feeder opening in a particulated form having a desired diameter without using any punching metal or slits.

This adjustment of the shape of the water retentive substance improves drying efficiency and prevents adhesion of the substance to the inner surface of the drying apparatus and deterioration of properties and quality of the dried product.

The drying method of the present invention is performed by using the drying apparatus comprising a pneumatic conveying dryer section, a pulverizer section provided at the lower part of the dryer section, a hot gas inlet provided below the pulverizer section, a classifier section provided at the upper part of the dryer section and a exhaust vent connected the upper end of the classifier, and feeding the water retentive substance to the dryer section at the site at least 500 mm above the pulverizer section. When the water retentive substance is fed to the dryer section at a site lower than this, the substance is liable to adhere to the inner surface of the drying apparatus because it has a higher water content than that of a substance conventionally applied to this kind of drying apparatus. The upper limit of the distance between the feeder opening and the pulverizer section is not specified so far as the substance to be dried is fed to the dryer section. It is considered that, when the water retentive substance is fed to the dryer section at a site at least 500 mm above the pulverizer section, even if the substance has a high water content, the surface of the substance in the form of particles having the above particle size is dried to some extent during the course of reaching to the pulverizer section and then the substance is pulverized at the pulverizer section without adhesion to obtain a desired drying state.

In the present invention, optionally, the inner surface of the drying apparatus can be covered with an anti-adhesion resin such as a fluorocarbon resin, for example, polytetrafluoroethylene, fluorinated ethylene propylene copolymer or polyhexafluoropropylene, or a fluoroplastic containing glass fiber, carbon, ceramic or silica. The covering can be performed by a standard manner. For example, at least at a part of the inner surface of the apparatus can be lined or coated with the anti-adhesion resin. Alternatively, a plate of the anti-adhesion resin can be provided at an appropriate inner part of the apparatus to prevent contact between the water retentive substance and inner surface of the apparatus. By covering the inner surface of the apparatus with the anti-adhesion resin, the water retentive substance having any water content in the above range can be dried without adhesion thereof to the inner surface and can be prevent deterioration of properties and quality of the substance.

However, it has been found that, in case of drying okara, the covering with the anti-adhesion resin is not necessarily required when the water content of okara is adjusted to 55 to 85% by weight. That is, according to the present invention, even if the inner surface of the apparatus is not covered with the anti-adhesion resin, okara having the water content of 55 to 85% by weight can be efficiently dried without adhesion of okara to the inner surface to obtain the dried product having excellent water retention capacity and good whiteness.

According to the drying method of the present invention, the drying can be performed until any level of the water content of the dried product is attained. Usually, the drying can be efficiently performed until the water content of the dried product is 10% or less without deterioration of its properties and quality. For example, in case of drying okara, it is possible to obtain the dried okara having excellent properties and quality such as that having the water retention capacity of 3 times or more, preferably, 3.5 times or more, and whiteness expressed by L value in the determination using a color-difference meter of 75 or more. This dried okara can be used as a raw material of various food products, for example, pre-mixes. Particularly, in view of its excellent water retention capacity, dried okara can be used in the food production as a water retention agent, a viscosity modifier, a thickening agent and the like. In addition, because dried okara has physiological activity such as lowering of serum cholesterol level, it can be also used as dietary fiber and the like.

The drying apparatus of the present invention may be the same pneumatic conveying drying apparatus as that known in the prior art for drying a hard substance or a substance requiring pulverization which comprises a pneumatic conveying dryer section, a pulverizer section provided at the lower part of the dryer section, a hot gas inlet provided below the pulverizer, a classifier section provided at the upper part of the dryer section and a exhaust vent connected to the upper end of the classifier section, except that a feeder opening is provided to the dryer section at a site at least 500 mm above the pulverizer section and a cover of the anti-adhesion resin is optionally provided to at least at a part of the inner surface thereof.

Now, referring to FIG. 1, a preferred embodiment of the method and the apparatus of the present invention is further illustrated in detail.

As shown in FIG. 1, the preferred embodiment of the drying apparatus of the present invention 1 comprises a pneumatic conveying dryer section 2, a pulverizer section 3 provided at the lower part of the dryer section 2, a hot gas inlet 4 provided below the pulverizer section 3, a classifier section 5 provided at the upper part of the dryer section 2 and an exhaust vent 6 connected to the upper end of the classifier section.

A feeder 7 is provided to the dryer section 2 and having the opening 8 at a site at least 500 mm (distance "d") above the pulverizer section 2. A punching metal 9 is provided at the feeder opening 8 for adjusting the particle size of the substance to be dried. A pulverizing hammer 10 driven by a motor 11 is provided to the pulverizer section 2. The inner surface of the pulverizer section is lined with the anti-adhesion resin such as a fluorocarbon resin, for example, polytetrafluoroethylene 12 to prevent adhesion of the water retentive substance. In the classifier section 5, there is provided a forced vortex type centrifugal classifier 13 having 12 to 24 classification blades and driven by motor 14.

The apparatus is operated by flowing a hot gas such as hot air at about 100° to 250° C., preferably, about 110° to 190° C. at a rate of about 2 to 6 m/sec. from the hot gas inlet 4 through the pulverizer, drying and classifier sections, driving the hammer 10 at a peripheral speed of about 60 to 70 m/sec., rotating the classifier 13 at about 120 to 240 r.p.m. and maintaining the temperature of the exhausted gas from the exhaust vent 6 at about 75° to 90° C.

In order to dry the water retentive substance such as okara, the substance is fed to the dryer section 2 from the feeder 7 through the opening 8 at an appropriate rate. Firstly, the substance falls to the pulverizer section 3 under the influence of gravity. Then, the substance is pulverized by the hammer 10 and whirled up toward the classifier 13 through the dryer section 2 by means of the hot gas flow from the hot gas inlet 4. During this process, the substance is dried. The pulverized and dried substance having a desired particle size is passed through the slits formed by the blades of the classifier 13 and recovered as the desired dried product. On the other hand, the substance having a relatively larger particle size and/or having a relatively higher water content is returned to the dryer section 2 without passing through the slits of the classifier 13 and is again pulverized and dried.

By maintaining the temperature of the exhausted gas at about 75° to 90° C., the dried product having a water content of about 5 to 10% and having excellent properties and quality can be obtained without adhesion thereof to the inner surface of the apparatus.

The following examples further illustrate the method of the present invention in detail but are not to be construed to limit the scope thereof.

EXAMPLE 1

The water content of okara obtained from the production of an isolated soybean protein was adjusted as shown in Table 1 by addition of water or previously prepared dried okara having a water content of 85% by weight. The okara was dried by using the drying apparatus as shown in FIG. 1 operating under the same conditions as described hereinabove (size of the hole of the punched metal: 2 mm in diameter, distance "d": 500 mm, hot gas temperature: 180° C., exhausted gas temperature: 80° C.). The same procedure was repeated except that the lining of the anti-adhesion resin of the apparatus was removed. The water retention capacity and color of the dried okara were determined and the degree of adhesion to the inner surface of the apparatus was observed.

The water retention capacity was determined by adding 100 g of water (10° C.) to 10 g of okara, allowing to stand at room temperature for 20 minutes to absorb water, wrapping with a filter cloth, centrifuging it at 1000 g for 5 minutes and weighing the residue. The water retention capacity (%) can be calculated according to the formula: $(W/10) \times 100$ wherein W is the weight of the residue.

The color tone of the dried okara was determined by using a color-difference meter (Nippon Denshyoku K.K.) with the water content thereof being 6% by weight and expressed by L value.

The adhesion was evaluated according to the following criterion.
A: No adhesion was observed.
B: A little adhesion was observed.
C: Adhesion was observed.
The results are shown in Table 1.

TABLE 1

| Water Content (wt %) | 40 | 50 | 60 | 70 | 80 | 90 |
|---|---|---|---|---|---|---|
| Water retention capacity (%) | 3.0 | 3.2 | 3.8 | 4.8 | 4.8 | 4.8 |
| Color tone | 62 | 73 | 85 | 86 | 86 | 84 |
| Adhesion (without lining) | A | A | A | A | B | C |
| Adhesion (with lining) | A | A | A | A | A | A |

As is seen from Table 1, when the water content of okara to be dried is lower than 55% by weight, adhesion is not observed even without the lining of the anti-adhesion resin. However, the water retention capacity of the resultant dried okara is lowered and browning is observed. On the other hand, when the water content of okara to be dried exceeds 85% by weight, adhesion is observed when the inner surface of the apparatus is not lined with the anti-adhesion resin.

EXAMPLE 2

According to the same procedure as in Example 1, okara having a water content of 80% by weight was dried by using the apparatus having no lining of the anti-adhesion resin and varying the distance "d" as shown in Table 2. The adhesion was evaluated according to the same manner as in Example 1. The results are shown in Table 2.

TABLE 2

| Distance "d" (mm) | 0 | 200 | 400 | 500 | 600 |
|---|---|---|---|---|---|
| Adhesion | C | C | C | B | A |

As is seen from Table 2, the distance "d" should be at least 500 mm to prevent adhesion of okara.

EXAMPLE 3

According to the same procedure as in Example 1, okara having a water content of 86% by weight was dried by using the apparatus having the lining of the anti-adhesion resin and varying the diameter of the holes of the punching metal as shown in Table 3. The color tone was determined according to the same manner as in Example 1. The results are shown in Table 3.

TABLE 3

| Diameter (mm) | 1 | 2 | 4 | 8 | 10 | 15 | 20 |
|---|---|---|---|---|---|---|---|
| L value | 70 | 85 | 85 | 83 | 80 | 72 | 70 |

As is seen from Table 3, when the diameter of the holes of the punching metal is 1.5 to 13 mm, preferably, 2.5 to 10 mm, dried okara having good whiteness is obtained.

What is claimed is:

1. A method for drying a water retentive substance which comprises the steps of
   adjusting the shape of a water retentive substance having a water content of 95 to 55% by weight to particles having a particle size of 1.5 to 13 mm;
   feeding the particles of the substance to a pneumatic conveying drying apparatus comprising a pneumatic conveying dryer section, a pulverizer section provided at the lower part of the dryer section, a hot gas inlet provided below the pulverizer, a classifier section provided at the upper part of the dryer section and an exhaust vent connected to the upper end of the classifier, said feeding being at a site at least 500 mm above the pulverizer section permitting the substance to fall to the pulverizer section under the influence of gravity;
   pulverizing the particles of the substance with the pulverizer;
   passing the pulverized substance through the dryer section by means of a hot gas flow from the hot gas inlet to dry the substance;
   classifying the pulverized substance by passing through the classifier; and
   venting the pulverized substance through the exhaust vent.

2. A method according to claim 1, wherein the water retentive substance is okara.

3. A method according to claim 2, wherein the water content of okara to be dried is adjusted to 55 to 85% by weight.

4. A method according to claim 2, wherein dried okara is added to okara to be dried to adjust its water content.

5. A method according to claim 2, wherein okara is pre-dried to adjust its water content.

6. A method for drying a water retentive substance which comprises the steps of adjusting the shape of a water retentive substance having a water content of 95 to 55% by weight to particles having a particle size of 1.5 to 13 mm;
   feeding the particles of the substance to a pneumatic conveying drying apparatus comprising a pneumatic conveying dryer section, a pulverizer section provided at the lower part of the dryer section, a hot gas inlet provided below the pulverizer, a classifier section provided at the upper part of the dryer section and an exhaust vent connected to the upper end of the classifier, said feeding being at a site at least 500 mm above the pulverizer section permitting the substance to fall to the pulverizer section under the influence of gravity, at least a part of the inner surface of said apparatus being covered with an anti-adhesion resin;

pulverizing the particles of the substance with the pulverizer;

passing the pulverized substance through the dryer section by means of a hot gas flow from the hot gas inlet to dry the substance;

classifying the pulverized substance by passing through the classifier; and venting the pulverized substance through the exhaust vent.

7. A method according to claim 6, wherein the water retentive substance is okara.

8. A method according to claim 7, wherein the water content of okara to be dried is adjusted to 55 to 85% by weight.

9. A method according to claim 7, wherein dried okara is added to okara to be dried to adjust its water content.

10. A method according to claim 7, wherein okara is pre-dried to adjust its water content.

* * * * *